United States Patent [19]
Johansen et al.

[11] Patent Number: 4,941,511
[45] Date of Patent: Jul. 17, 1990

[54] DEVICE WITH A VALVE FUNCTION

[75] Inventors: Trond V. Johansen; Ola Ruch, both of Trondheim; Ludvig Naess, Tiller; K. P. Kristjansson, Skjetnehaugen; S. F. Utengen, Flataasen, all of Norway

[73] Assignee: Den norske stats oljeselskap a.s, Norway

[21] Appl. No.: 170,386

[22] PCT Filed: Jul. 8, 1987

[86] PCT No.: PCT/NO87/00054
§ 371 Date: May 6, 1988
§ 102(e) Date: May 6, 1988

[87] PCT Pub. No.: WO88/00313
PCT Pub. Date: Jan. 14, 1988

[30] Foreign Application Priority Data
Jul. 9, 1986 [NO] Norway .................... 862775

[51] Int. Cl.⁵ ................. F16L 55/10; F16K 7/10
[52] U.S. Cl. ................. 138/89; 137/517; 138/93; 166/187; 277/34; 405/170
[58] Field of Search ............ 138/89, 93; 405/169, 405/170, 172; 251/4, 5; 166/187; 277/34, 34.3, 34.6; 137/459, 460, 461, 517

[56] References Cited

U.S. PATENT DOCUMENTS

| | | | |
|---|---|---|---|
| 3,456,725 | 7/1969 | Hatch | 166/187 |
| 3,460,624 | 8/1969 | Aitken et al. | 166/187 |
| 3,746,026 | 7/1973 | Herring | 137/1 |
| 3,750,451 | 8/1973 | Nolan, Jr. | 405/170 |
| 3,943,982 | 3/1976 | Lecordier | 138/89 |
| 3,978,892 | 9/1976 | Scodino | 138/89 |
| 4,026,329 | 5/1977 | Thompson | 138/89 |
| 4,260,164 | 4/1981 | Baker et al. | 166/187 |
| 4,299,397 | 11/1981 | Baker et al. | 277/34 |
| 4,332,277 | 6/1982 | Adkins | 138/89 |
| 4,365,649 | 12/1982 | Jones | 138/93 |
| 4,390,043 | 6/1983 | Ward | 138/89 |
| 4,398,601 | 8/1983 | Schwendemann et al. | 166/217 |
| 4,413,653 | 11/1983 | Carter, Jr. | 138/93 |
| 4,422,477 | 12/1983 | Wittman et al. | 405/170 |
| 4,423,754 | 1/1984 | Carter, Jr. | 138/93 |
| 4,424,861 | 1/1984 | Carter, Jr. et al. | 166/187 |
| 4,429,720 | 2/1984 | Beck et al. | 138/89 |
| 4,465,104 | 8/1984 | Wittman et al. | 138/89 |

FOREIGN PATENT DOCUMENTS 0087867 9/1983 European Pat. Off. .
3142768 4/1984 Fed. Rep. of Germany .

Primary Examiner—George L. Walton
Attorney, Agent, or Firm—Lucas & Just

[57] ABSTRACT

Device with valve function which can be brought into and out of a pipeline and parked in the same. The device comprises a channel for throughflowing fluid, a valve (2) which is medium controlled and/or remote-controlled, a parking brake/packer seal unit (9) which with limited force can be brought to bear against the wall of the pipeline, a cylindrical wire anchor (1) with an external diameter which is slightly lesser than the internal diameter of the pipeline and can be brought into pressure contact with the pipeline.

7 Claims, 1 Drawing Sheet

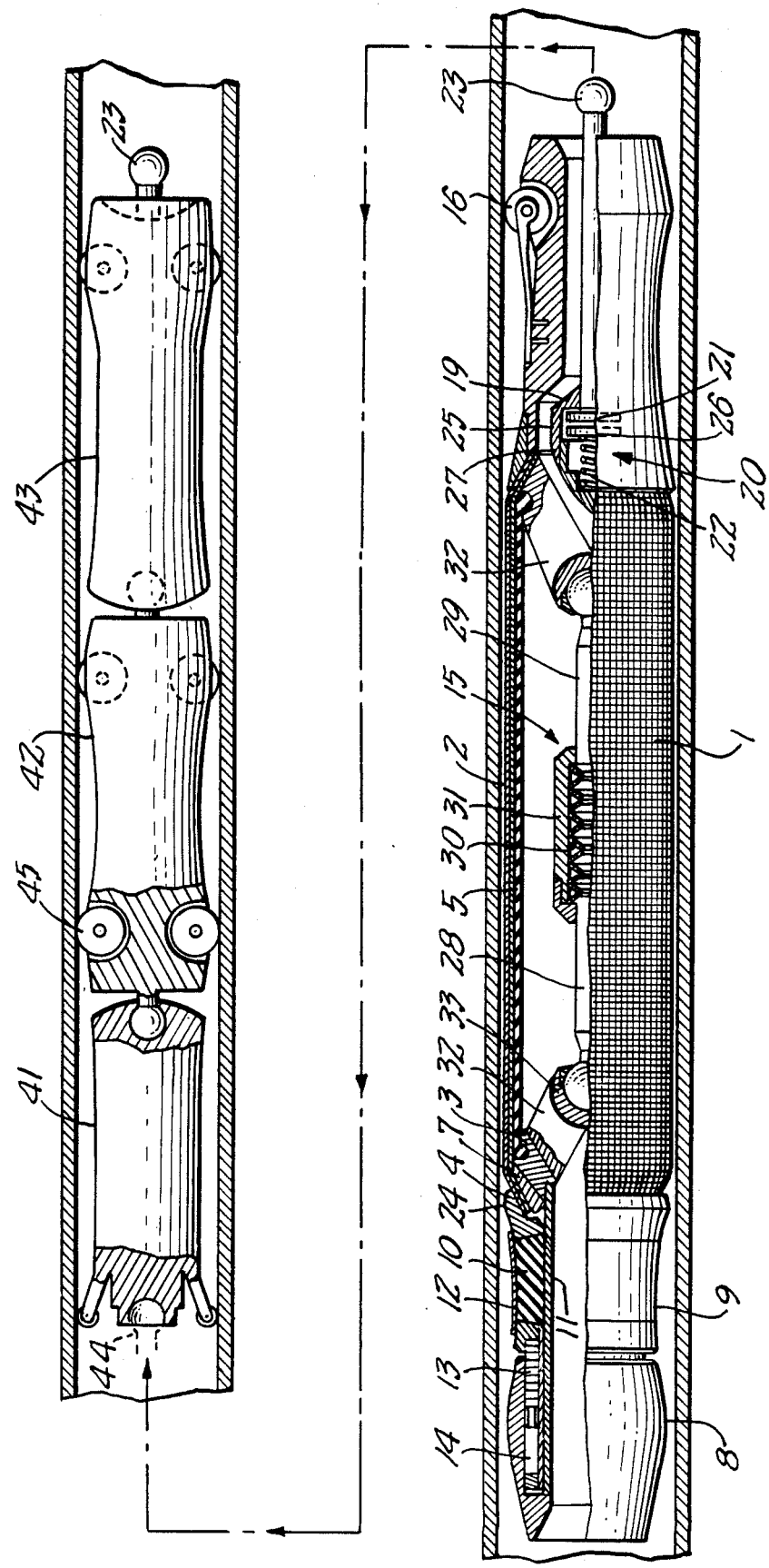

DEVICE WITH A VALVE FUNCTION

The present invention relates to a device with a valve function which can be brought into and out of a pipeline.

Devices with a valve function which can be brought into and out of a pipeline and parked in the same are known.

BACKGROUND ART

1. From U.S. patent document No. 3503754, for example, a pig with an axial valve system is known, where the pig can be anchored in a pipeline by means of pins which are inserted through the pipeline walls from the outside and against which the pig is secured. The pig according to the patent document shall primarily be used for shut-off of the fluid flow during brief periods of pipeline repairs etc., and can not be permanently installed.

2. From U.S. patent document No. 3746026 a blocking pig is known which features parking brakes and sealing devices for temporary shutoff of a pipeline at a predetermined point. The blocking pig, however, lacks a separate valve function, and consequently cannot be permanently installed in a pipeline either.

From DE patent document No. 3142768, an internal blocking device for a pipeline is known which comprises two flanges and a cylinder connecting these. Outside the cylinder, on the outermost part between said cylinder and the pipeline wall, an elastic tube has been installed, consisting of a rubber-type, synthetic material, which is reinforced with several layers of metal sheathing. Inside the tube, an inflatable bellow is mounted which receives pressure medium from pressure bottles located inside the cylinder. The tube and the inflatable bellow have a double function in that both shall seal off fluid which flows into the pipeline and anchor the blocking device in the pipeline. The blocking device does not feature a separate valve function, and must therefore be inserted into the pipeline each time the pipeline is to be blocked.

DISCLOSURE OF INVENTION

The object of the present invention is to provide a device with a valve function which can be brought into and out of an already existing pipeline without having to modify the pipeline, and which can be parked at the desired point and can remain there also during normal operation over an extended period. Moreover, the force exerted by the device on the pipeline during normal operation must be limited, in order to avoid local overloading at the same time as the device must be safely anchored when the valve is closed and there is a great drop in pressure over the device. Another object is to provide a device comprising a valve which closes automatically and instantly at a given pressure difference and which can also be opened/closed at a signal. According to the invention, this is provided by a device characterized by comprising a channel for throughflowing fluid, a medium controlled and/or remote-controlled valve, a parking brake/packer seal unit which with limited force can be brought to bear against the wall of the pipeline, and a cylindrical wire anchor with an external diameter corresponding to or slightly less than that of the pipeline's internal diameter and which can be brought into pressure contact with the pipeline.

Another object is to provide a device of a simple design and low weight which is cheap in production. This can be obtained by locating the valve and parking brake in separate sections with the cylindrical wire anchor in between to connect these and with a spring shaft located in contact with the sections to keep these at a given distance from each other.

Further advantageous features of the invention will become apparent from the description below and the dependent claims.

MODES FOR CARRYING OUT THE INVENTION

In the following, the invention will be further explained with reference to an embodiment of the device which is shown on the enclosed drawing.

The FIGURE gives an example of a device according to the invention which is coupled together with a transport vehicle. The said transport vehicle is divided into three and consists of a driving carriage 42 and an energy and generator carriage 43. The energy and generator carriage 43 features a coupling ball for possible coupling up with a stand-by pig. The motor and driving wheels 45 bear against the internal wall of the pipeline and can be driven in both directions. Instead of wheels 45, belts and other driving devices can also be utilized. The coupling and communication carriage 41 of the transport vehicle is coupled to the device according to the invention. All couplings between the carriages 41, 42, 43 and between the transport vehicle and the device consist of freely pivotal universal couplings 23, 44. The coupling and communication carriage 41 and energy and generator carriage 43 are preferably equipped with freely rotatable guide wheels 16, 24, which run against the internal wall of the pipeline.

In the embodiment referred, the device is shaped as an extended unit and features a throughflowing fluid channel internally, which is connected with a valve 20. The valve 20 is designed to permit opening and closing of the valve in two independent ways. According to the first way, the valve 20 closes automatically if the drop in pressure over the valve 20 exceeds a given limit, and below this limit, it will be open. According to the second way, the valve can be forced open or closed by means of a remote control. Instead of being fluid-operated, the valve 20 can be motor-operated.

The valve 20 is preferably located in a first section and consists of a valve seat 19 installed as a part of and on the lower side of the enclosing edge of the section and coaxially with the fluid channel, a valve body 25 with contact surface adapted to the valve seat 19, a valve spindle 26, a guiding device 27 on the valve spindle 26, several centering springs 22 and an actuator 21. Through the guiding device 27, the valve body 25 is attached to the valve spindle 26 so that it can be moved a limited distance in the axial direction of the device. The centering-springs 22 are located on both sides of the guiding device 27 and arranged to keep the valve in open position when the drop in pressure over the device is within the given limits. When the drop in pressure exceeds this limit, the force exerted on the valve 20 from the fluid is greater than the force exerted from the springs 22, and the valve is closed. When the valve is closed by means of remote control, e.g. during testing, the actuator 21 moves the valve spindle 26, and thus the valve body 25, so that this is brought to bear against the valve seat 19. When there is a negative drop in pressure over the device, the springs 22 will force the valve 20 open, and fluid will be let through. A communication unit which is connected to the actuator of the valve 20 is located in the first section and makes it possible to open/close the valve 20 by means of an external wireless control. An energy source which is sufficient for the execution of the desired number of closing/opening operations is connected to the valve 20 and the communication unit.

During normal operating, the device will be secured to the internal wall of the pipeline at the desired point by means of a combined parking brake and a packer seal unit 9 installed in a second section. To obtain the desired elasticity, this is built up with a soft core consisting of an approximately circular elastomer hose 10 which is enclosed by a somewhat more rigid annular seal packing 12. The approximately circular room enclosed by the elastomer hose 10 is connected with the throughflowing fluid channel through an aperture 11. The annular, preferably reinforced, packer seal unit which encloses the soft core is rigid and will permit passing of welds and other protrusions on the pipeline surface, and will also allow the extremely great tolerances which such a seal packing must satisfy. The combined parking brake and packer seal unit 9, hereafter called the parking brake 9, will during normal parking and operation get its holding pressure from an actuator 13. This is accomplished by the parking brake 9 being pressed together in axial direction by the actuator 13, whereby it due to its special composition will expand radially outward to bear firmly against the inner side of the transport pipeline. When the pressure difference over the device increases, the aperture 11 will lead to increasing contact pressure between the parking brake 9 and the pipeline wall. The parking brake 9 is installed to keep the entire device parked at a desired place during normal operation with the valve in open position. The parking brake 9 works with limited, given force against the pipeline wall so that this shall not be under heavy stress over a long period of time. When the valve is closed and the pipeline is under pressure, the combined parking brake and seal packing will not be sufficiently powerful for anchoring of the device in the pipeline. A separate cylindrical wire anchor 1 has therefore been installed which has the same or a somewhat smaller diameter than the pipeline's internal diameter in the parking zone. The wire anchor 1 consists of one or several layers of high-grade wire 2 which is/are attached to clamping rings 3, 4 with conical wedges 7 mounted inside the wires. In addition, an elastomer 5 which constitutes the elastic core and seal element in the wire anchor 1 will vulcanize the wires 2 and wedges 7 to the clamping rings 3, 4. The vulcanization of the elastomer will also enter into the clamping rings 3, 4 and establish a good contact. In some cases, reinforcement in the elastomer 5 will also be relevant. In that case, also the reinforcement will be enclosed by the clamping rings 3, 4.

On larger versions, the clamping rings 3, 4 will be divided into two to provide for improved anchorage in clamping slots. The clamping ring elements 3, 4 will then appropriately clamp the elastomer 5 with reinforcement in each clamping slot. Cylindrical roller bearings 24 have been installed on the largest diameter of the clamping rings. The roller bearings 24 prevent the device from jamming when passing tight bends. Corresponding roller bearings 8 are also located on the two other tops to prevent jamming in the bends.

When closing the valve 20, the pressure developing on the upstream side of the valve 20 will urge the wire anchor 1 outward to bear against the pipeline. The contact pressure of the wire anchor will therefore increase proportionally with the increase in pressure difference over the device.

The wire anchor 1 is preferably installed between the two abovementioned sections, connecting these. To keep the sections apart, a spring shaft 15 is installed which is preferably located centrally in the device, and is fastened by means of rigid stays or linking means 32 in each end which are connected to the clamping rings 3, 4 of the section. The spring shaft 15 preferably consists of two tubes 28, 29 and a spring 30 clamped between these. A sleeve 31 encloses the shaft elements 15 so that they can only be moved in relation to each other in axial direction. With the shaft 15 in mounted position, the spring 15 exerts a pre-stressing force against the tube ends 28, 29. Elastomers have been installed between the shaft ends 15 and the stays 32. The shaft 15 is mounted with spring action in axial direction to compensate for the contraction which must necessarily be present during full differential pressure to provide for sufficient contact between the wire anchor and the pipeline.

In one embodiment, which is not shown in the figure, a communication unit has been installed in the hollow shaft 15, which can be wireless-controlled and is in contact with the actuator 13, 14 of the parking brake 9, and can activate this. Also the energy source of the actuator 13, 14 may then be stored in the hollow shaft 15.

The device is transported to parking position in the pipeline by being coupled together with the transport vehicle by means of a coupling ball, and is brought by this to the desired position. In order to prevent the device from jamming in a bend or from being damaged during the transport, the device features several stabilization wheels 16 in the front and back. When parking the device, energy is supplied from the transport vehicle to the actuator 13, 14, unless energy is stored in the hollow room of the spring shaft 15. After completed parking, the transport vehicle is disconnected and removed. The device preferably features coupling balls 23 in both ends so that it can be removed again in any direction. Centrically in the couplings 23, there are connections which enables the vehicle to activate or partly activate the valve 20 and parking brake 9 respectively.

We claim:

1. A device with valve function which can be brought into and out of a pipeline, and be parked in the pipeline over long periods of time as a safety valve during operation of the pipeline, the device comprises:
   a first section comprising a valve which in uninfluenced position being kept in centered open position by centering springs (22) for allowing normal fluid flow through said device and being closed automatically and instantly when the differential pressure of the normal fluid flow acting on the first section exceeds a predetermined limit,
   a second section comprising a parking brake/packing sealing unit consisting of an elastomer hose which can be brought to bear tight agaisnt the wall of the pipeline by means of being compressed in the radial direction of the device, causing the parking brake/seal packing (9) to expand in axial direction,
   a cylindrical wire anchor connecting the first and second sections and consisting of at least one layer of high-grade wire (2) which outwards borders to the pipeline wall, and inside comprise a fluid-tight elastomer layer (5) where both layers (2, 5) at each end of the cylindrical wire anchor are attached on the first and second sections respectively, said cylindrical wire anchor being urged against the pipeline wall as a consequence of the differential pressure acting against the first section when the valve is closed, a shaft (15) being disposed within said wire anchor and installed with spring action means for movement in an axial direction to compensate for contraction thereof which arises due to the increased differential pressure to urge the wire anchor outwardly against the wall of the pipeline to provide for sufficient contact between the wire anchor and the pipeline wall, thereby providing additional brake means for preventing movement of said device and said shaft is connected with rigid linkage means (32) for connecting the ends of the shaft (15) with the first and second sections, and a channel for communicating the normal fluid flow through the first section, the cylindrical wire and the second section.

2. The device of claim 1 wherein the elastomeric layer (5) is vulcanized to wire layer (2).

3. The device of claim 1 wherein the parking brake/seal packing (9) consists of a soft core with an elastomer hose (10) which encloses a room connected through an aperture (11) with the transversing channel, and the elastomer hose (10) being enclosed by a more rigid, annular packing (12).

4. The device of claim 3 wherein increased differential pressure over the device transferring increased pressure through the aperture (11) to the room enclosed by the elastomer hose (10), resulting in increased contact pressure between the parking brake/seal packing (9) and the pipeline wall.

5. The device of claim 1 wherein the shaft (15) comprises two tubes (28, 29) located centrally in the axial direction of the device, a spring (30) installed at the middle section of the shaft (15) between the tubes (28, 29), a sleeve (31) which encloses the middle section of the shaft and spring (39).

6. The device of claim 5 wherein elastomers (33) are installed between the shaft ends (15) and linkage means (32).

7. The device of claim 1 wherein the valve in the first section is closed by means of a hydraulic actuator.

* * * * *